United States Patent
Song et al.

(10) Patent No.: US 11,064,127 B2
(45) Date of Patent: Jul. 13, 2021

(54) CONTROL SYSTEM FOR CONTROLLING PLURALITY OF USER TERMINALS

(71) Applicant: FANLIGHT CO., LTD., Seoul (KR)

(72) Inventors: Ho Lim Song, Seoul (KR); Jung Min Choi, Seoul (KR)

(73) Assignee: FANLIGHT CO., LTD., Seoul (KR)

( * ) Notice: Subject to any disclaimer, the term of this patent is extended or adjusted under 35 U.S.C. 154(b) by 0 days.

(21) Appl. No.: 16/681,422

(22) Filed: Nov. 12, 2019

(65) Prior Publication Data

US 2020/0084360 A1 Mar. 12, 2020

Related U.S. Application Data

(63) Continuation of application No. PCT/KR2018/005240, filed on May 8, 2018.

(30) Foreign Application Priority Data

May 12, 2017 (KR) .................. 10-2017-0058986

(51) Int. Cl.
*H04N 5/235* (2006.01)
*H04N 5/232* (2006.01)
(Continued)

(52) U.S. Cl.
CPC ...... *H04N 5/2352* (2013.01); *H04M 1/72409* (2021.01); *H04M 1/72442* (2021.01);
(Continued)

(58) Field of Classification Search
CPC ............. H04N 5/2352; H04N 5/23206; H04N 5/23219; H04N 9/74; H04M 1/72527;
(Continued)

(56) References Cited

U.S. PATENT DOCUMENTS

| 7,782,363 B2 * | 8/2010 | Ortiz ................. H04N 5/44 348/211.8 |
| 9,094,489 B1 | 7/2015 | Groenjes |

(Continued)

FOREIGN PATENT DOCUMENTS

| JP | 2000-152206 A | 5/2000 |
| JP | 2002-351762 A | 12/2002 |

(Continued)

OTHER PUBLICATIONS

International Search Report issued in PCT/KR2018/005240; dated Aug. 14, 2018.

(Continued)

*Primary Examiner* — Gevell V Selby
(74) *Attorney, Agent, or Firm* — Studebaker & Brackett PC

(57) ABSTRACT

Disclosed is a control system for controlling a plurality of user terminals. The control system includes at least: a control device including a processor, and configured to determine a command to be executed by the plurality of user terminals located in a concert hall or stadium; a transmitter configured to transmit a wireless signal corresponding to the determined command; a plurality of receivers, each of which is connected to a respective user terminal of the plurality of user terminals, receives the wireless signal, and transmits the received wireless signal to the respective user terminal; and the plurality of user terminals, each of which is configured to perform a command corresponding to the wireless signal transmitted from a respective receiver of the plurality of receivers.

9 Claims, 8 Drawing Sheets

(51) Int. Cl.
*H04N 9/74* (2006.01)
*H04M 1/72409* (2021.01)
*H04M 1/72442* (2021.01)

(52) U.S. Cl.
CPC ..... *H04N 5/23206* (2013.01); *H04N 5/23219* (2013.01); *H04N 9/74* (2013.01)

(58) Field of Classification Search
CPC ..... H04M 1/72558; H04W 4/02; H04W 4/80; H04W 4/06; H04W 4/33; H04W 12/00405; A63J 3/00; G06F 21/35; H04L 29/08

See application file for complete search history.

(56) References Cited

U.S. PATENT DOCUMENTS

| | | | |
|---|---|---|---|
| 9,264,598 B1* | 2/2016 | Baldwin | H04N 5/23238 |
| 2013/0203036 A1 | 8/2013 | Jabara et al. | |
| 2014/0046802 A1* | 2/2014 | Hosein | G06Q 30/06 705/26.61 |
| 2015/0012308 A1 | 1/2015 | Snyder | |
| 2015/0262195 A1* | 9/2015 | Bergdale | G07C 9/29 705/5 |
| 2019/0349425 A1* | 11/2019 | Shimakawa | H04W 4/02 |

FOREIGN PATENT DOCUMENTS

| | | |
|---|---|---|
| JP | 2004-242200 A | 8/2004 |
| JP | 2010-252374 A | 11/2010 |
| KR | 10-2009-0104231 A | 10/2009 |
| KR | 10-2011-0119388 A | 11/2011 |
| KR | 10-2012-0102256 A | 9/2012 |
| KR | 10-2013-0092836 A | 8/2013 |
| KR | 10-2016-0089811 A | 7/2016 |
| KR | 10-2016-0149567 A | 12/2016 |

OTHER PUBLICATIONS

Office Action issued in KR 10-2017-0058986; mailed by the Korean Patent Office dated Dec. 10, 2018.

The extended European search report issued by the European Patent Office dated Mar. 5, 2020, which corresponds to European Patent Application No. 18798234.3-1218 and is related to U.S. Appl. No. 16/681,422.

An Office Action; "Notice of Reasons for Refusal", mailed by the Japanese Patent Office dated Nov. 4, 2020, which corresponds to Japanese Patent Application No. 2019-561813 and is related to U.S. Appl. No. 16/681,422; with English language translation.

* cited by examiner

CONTROL SYSTEM FOR CONTROLLING PLURALITY OF USER TERMINALS

CROSS-REFERENCE TO RELATED APPLICATIONS

The present application is a continuation of International Patent Application No. PCT/KR2018/005240, filed May 8, 2018, which is based upon and claims the benefit of priority to Korean Patent Application No. 10-2017-0058986, filed on May 12, 2017. The disclosures of the above-listed applications are hereby incorporated by reference herein in their entirety.

BACKGROUND

Embodiments of the inventive concept described herein relate to a control system for controlling a plurality of user terminals possessed by a crowd of people.

In general, a lighting apparatus is provided for the purpose of illumination by reflecting, refracting, and transmitting light from a light source. The lighting apparatus may be classified into an indirect lighting apparatus, a semi-indirect lighting apparatus, a general diffusion lighting apparatus, semi-direct lighting apparatus, and a direct lighting apparatus based on light distribution.

Due to the development of technology, lighting apparatuses have been used for various purposes. As an example, a lighting apparatus is used to create a media facade. The media facade refers to the implementation of a media function by installing a lighting apparatus on an exterior wall of a building.

As another example, the lighting apparatus may be used as a small cheering tool in sports events, concerts, or the like that are conducted in an environment of specified illuminance or less. However, in such an environment, because a plurality of lighting apparatuses are individually controlled, it is difficult to generate a systematic lighting pattern or shape. In addition, it is not easy to achieve the expected cheering effect by using the light source arranged in the lighting apparatus.

SUMMARY

Embodiments of the inventive concept provide a control system for controlling a plurality of user terminals possessed by a crowd of people.

Objects of the inventive concept may not be limited to the above, and other objects will be clearly understandable to those having ordinary skill in the art from the following disclosures.

According to some exemplary embodiments, a control system for controlling a plurality of user terminals includes: a control device including a processor, and configured to determine a command to be executed by the plurality of user terminals located in a concert hall or in a stadium; a transmitter configured to transmit a wireless signal corresponding to the determined command; a plurality of receivers, each of which is connected to a respective user terminal of the plurality of user terminals, receives the wireless signal, and transmits the received wireless signal to the respective user terminal; and the plurality of user terminals, each of which is configured to perform a command corresponding to the wireless signal transmitted from a respective receiver of the plurality of receivers.

Other specific details of the inventive concept are included in the detailed description and drawings.

BRIEF DESCRIPTION OF DRAWINGS

The above and other objects and features will become apparent from the following description with reference to the following figures, wherein like reference numerals refer to like parts throughout the various figures unless otherwise specified, and wherein.

DETAILED DESCRIPTION

Figure 1:
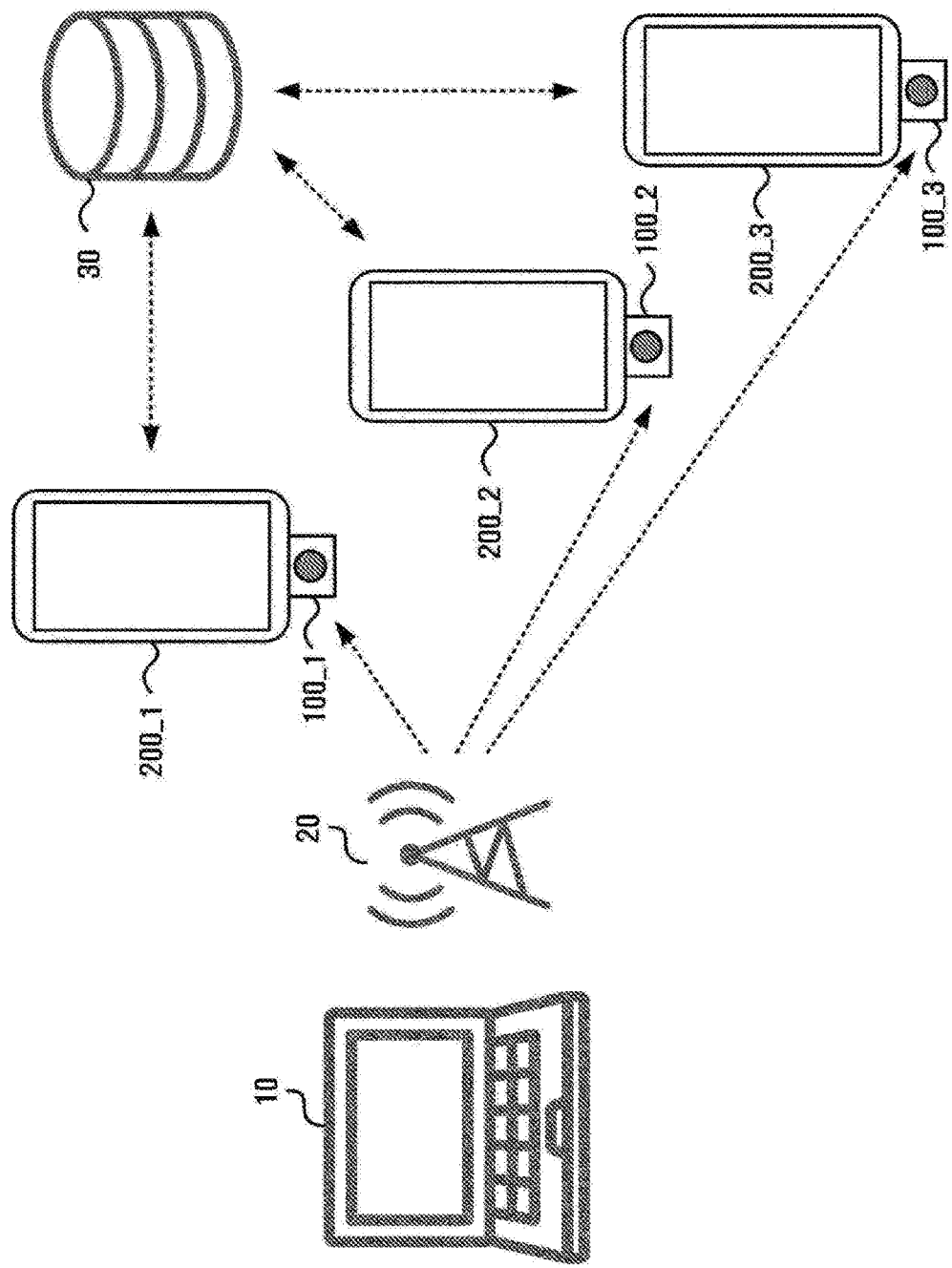
FIG. 1 is a conceptual diagram illustrating a control system according to some embodiments of the present disclosure.

Advantages and features of embodiments of the inventive concept, and method for achieving them will be apparent with reference to the accompanying drawings and detailed description that follows. However, it should be understood that the inventive concept is not limited to the following embodiments and may be embodied in different ways, and that the embodiments are given to provide complete disclosure of the inventive concept and to provide thorough understanding of the inventive concept to those skilled in the art, and the scope of the inventive concept is limited only by the accompanying claims and equivalents thereof.

The terms used in the present disclosure are provided to describe embodiments, not intended to limit the inventive concept. In the present disclosure, singular forms are intended to include plural forms unless the context clearly indicates otherwise. It will be further understood that the terms "comprises" and/or "comprising," used herein, specify the presence of stated elements, but do not preclude the presence or addition of one or more other elements. In the present disclosure, like reference numerals indicate like elements, and the term "and/or" indicates each of the listed components or various combinations thereof. Terms, such as "first," "second" and the like, are for discriminating various components, but the scope is not limited to the terms. The terms are used for discriminating one component from another component. Therefore, the first component mentioned below may be the second component within the technical spirit of the inventive concept.

Unless otherwise defined, all terms used herein (including technical or scientific terms) have the same meanings as those generally understood by those skilled in the art to which the inventive concept pertains. Such terms as those defined in a generally used dictionary are not to be interpreted as having ideal or excessively formal meanings unless defined clearly and specifically.

The term "device" or "module," as used in the specification, refers to software or a hardware component, such as a Field Programmable Gate Array (FPGA) or Application-Specific Integrated Circuit (ASIC), which perform functions. However, the term "device" or "module" is not limited to software or hardware. The "device" or "module" may be configured to be included in an addressable storage medium and to play one or more processors. Accordingly, as an example, the term "device" or "module" includes components, such as software components, object-oriented software components, class components, and task structural components, processes, functions, attributes, procedures, subroutines, segments of a program code, drivers, firmware, microcode, circuit, data, database, data structures, tables, arrays, and variables. Functions provided in components and "device" or "module" may be engaged by a smaller number of components and "device" or "module," or may be divided into additional components and "device" or "module".

Spatially relative terms, such as "beneath," "below," "lower," "above," "upper" and the like, may be used herein for ease of description to describe one element or feature's relationship to another element(s) as illustrated in the figures. It will be understood that the spatially relative terms are intended to encompass different orientations of the element in use or operation in addition to the orientation depicted in the drawings. For example, when the element in the drawings is turned over, elements described as "below" or "beneath" other elements would then be oriented "above" the other elements. Thus, the term "below" may encompass both an orientation of above and below. The element may be otherwise oriented at other orientations and the spatially relative terms used herein interpreted accordingly.

Hereinafter embodiments of the inventive concept will be described in detail with reference to the accompanying drawings.

FIG. 1 is a conceptual diagram illustrating a control system according to some embodiments.

Referring to FIG. 1, a control system according to some embodiments includes a control device 10, a transmitter 20, a server 30, one or more receivers 100_1 to 100_3, and one or more user terminals 200_1 to 200_3.

In some embodiments, the control device 10 includes a processor. In some embodiments, the control device 10 is a lighting control device. For example, the control device 10 is a DMX control device using DMX 512 (Digital Multiplex), which is a standard for digital communication networks that are commonly used to control stage lighting and effects.

In addition, the control device 10 according to some embodiments is a computing device including a personal computer (PC), a laptop computer, a tablet PC, a smartphone, and the like, each of which includes a hardware processor.

In some embodiments, the control device 10 is configured as a combination of a lighting control device and a computing device. Any type of device that is capable of transmitting a control command to the transmitter 20 can be utilized as the control device 10.

The transmitter 20 wirelessly transmits a signal corresponding to a command received from the control device 10.

The transmitter 20 includes at least one antenna module for transmitting a command received from the control device 10.

The signal transmitted by the transmitter 20 is received by each of the receivers 100_1 to 100_3, and each of the receivers 100_1 to 100_3 receiving the signal transfers the received signal to each of the user terminals 200_1 to 200_3.

Each of the user terminals 200_1 to 200_3 performs a command corresponding to the transmitted signal and communicates with the server 30 to perform the command if necessary.

In some embodiments, each of the user terminals 200_1 to 200_3 is a mobile terminal including a smartphone, a tablet PC, and the like, but is not limited thereto.

The server 30 stores data configured to be used by the user terminals 200_1 to 200_3 to perform a command. In some embodiments, when it is necessary to transmit a large amount of data that is difficult to be transmitted by the transmitter 20, the transmitter 20 transmits a link for downloading data, and the user terminals 200_1 to 200_3 download the data corresponding to the link from the server 30.

In some embodiments, when a large amount of data is transmitted by the transmitter 20, the control device 10 divides the large amount of data and transmit the divided data to the transmitter 20, and the transmitter 20 transmits the divided data. In such embodiments, the user terminals 200_1 to 200_3 combine the divided data to restore the data.

In some embodiments, the control device 10 divides an application installation file configured to be used to perform a command, transmits the divided application file to the transmitter 20, and transmits guide information configured to be used for installing an application or an instruction to install the application, thereby enabling the user terminals 200_1 to 200_3 to install the application.

In some other embodiments, the control device 10 transmits a link for downloading an application, an application installation guide and an installation instruction, and the user terminals 200_1 to 200_3 download the application installation file from the server 30 and install the application corresponding to the command received from the control device 10.

In some other embodiments, the user terminals 200_1 to 200_3 download and install an application from an application download server corresponding to a user operation, and controlling according to some embodiments is possible only for a user terminal in which the application is installed.

The control device 10 according to some embodiments transmits a request signal for checking whether an application is installed in each of the user terminals 200_1 to 200_3 by using the transmitter 20. When an application is not installed, each of the user terminals 200_1 to 200_3 requests an application installation file from the server 30 to install the application. In some embodiments, the control device 10 transmits the installation file of the application by using the transmitter 20. When the application is not installed, each of the user terminals 200_1 to 200_3 install the application by using the received installation file.

In some embodiments, the control system shown in FIG. 1 is utilized in a concert hall or sports stadium. In such embodiments, audiences of the concert hall or sports stadium may receive or purchase receivers, respectively, and may couple the receiver with each user terminal of the audiences. The system manager of the concert hall or sports stadium may provide information, advertisements, messages, and the like necessary for each concert hall or sports stadium to the audiences by using the control device 10 and the transmitter 20.

Figure 2:
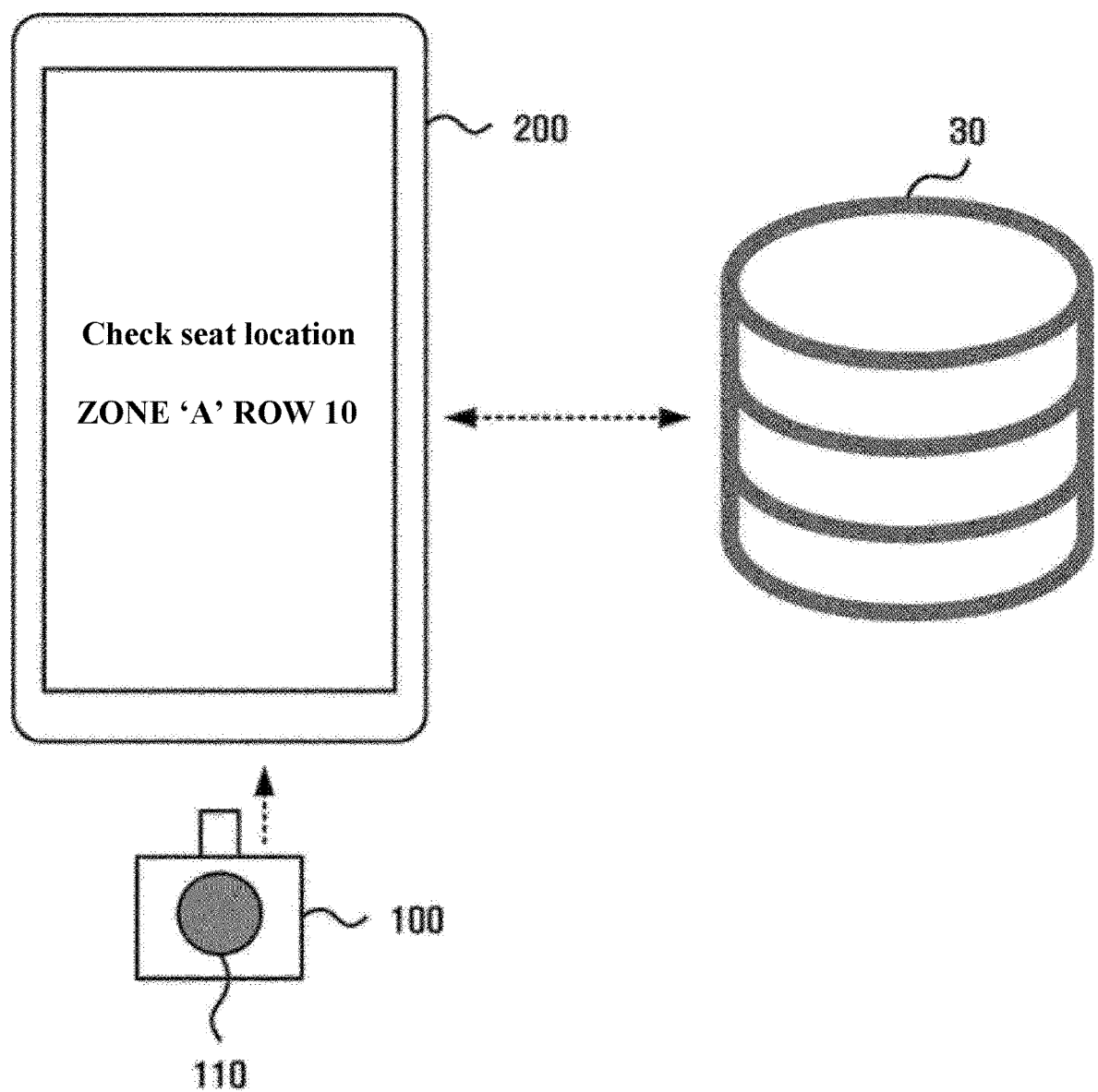
FIG. 2 is a diagram illustrating a receiver and a user terminal according to some embodiments of the present disclosure.

FIG. 2 is a diagram illustrating a receiver and a user terminal according to some embodiments.

FIG. 2 shows a receiver 100 and a user terminal 200, which are also illustrated in FIG. 1.

When the control system according to some embodiments is used in a concert hall or a sports stadium, an assigned seat is determined for each audience. In some embodiments, in the case of a standing concert or a general seat of a stadium, an area is determined instead of a particular seat. For the convenience of explanation, the case where the seat for each audience is determined will be described.

The user terminal 200 obtains information about a seat location of an audience. Although a scheme of obtaining information about a seat location by the user terminal 200 is not limited, the following schemes may be utilized as an example and not limited thereto.

First, the user terminal 200 obtains information about the seat location from the receiver 100. For example, the receiver 100 is provided to each of the audiences, and information about each seat location is inputted to each receiver 100.

In such a situation, the manager checks tickets of audiences and provide each audience with the receiver 100 in which information about the seat location corresponding to a respective ticket is inputted. The audience connects the received receiver 100 to the user terminal 200, and the user terminal 200 obtains the information about the seat location stored in the receiver 100.

In some embodiments, information about each seat location is configured to be stored in the receiver 100 by using wired or wireless communication. In some embodiments, the information about the seat location stored in each receiver 100 is fixed, or in some other embodiments, the information about the seat location stored in each receiver 100 is set differently for each event.

For example, the manager connects the computing device or a device (e.g., a seat information inputter, not show) for inputting a seat location to the receiver 100 to the receiver 100 by wire or wirelessly, and after inputting the seat location corresponding to the ticket information of each audience to the receiver 100, provides the receiver 100 to the audience.

In some embodiments, the seat location corresponding to the ticket information of each audience is manually inputted by the manager, and in some other embodiments, the seat location is automatically obtained by scanning a two-dimensional code (barcode, QR code, and the like) or Near-field communication (NFC), Radio-frequency identification (RFID), beacons, and the like included in the ticket and the obtained seat information is stored in the receiver 100. The manager according to some embodiments provides the receiver 100 to which the seat information is inputted to the audience.

Second, the user terminal 200 according to some embodiments receives the seat information directly from the user or manager. In addition, the user terminal 200 obtains the seat information from the server 30 by using information about the user or information included in identification (ID) of the user logged in to the user terminal 200.

Third, the user terminal 200 according to some embodiments scans a two-dimensional code (barcode, QR code, and the like) or NFC, RFID, beacons, and the like included in the ticket and transmits the scanned information to the server 30, thereby receiving information about the seat location, a necessary application and data according to some embodiments. In this case, the scanning of the ticket is not only for obtaining information about the seat location, but also for authenticating the authority to receive specific data. For example, there is a video or audio that can be obtained only by the audience who participates in a specific concert or game, and there is a real-time relay video, live broadcast, voice, and the like provided from the concert or game place. As an authentication procedure for accessing such information, the user terminal 200 according to some embodiments scans a ticket, and the server 30 according to some embodiments transmits data to the user terminal of the user who is authorized by purchasing the ticket after performing authentication by using scan information of the ticket.

In some embodiments, the seat information obtained by the user terminal 200 is transferred to the receiver 100. The receiver 100 according to some embodiments stores the seat information received from the user terminal 200.

The manager of a concert hall or stadium according to some embodiments controls each receiver 100 and the user terminal 200 by using the seat information stored in the receiver 100 or the user terminal 200.

For example, the manager transmits different commands to each seat, such that the receivers 100 and the user terminals 200 of all audiences perform different commands to produce various effects.

In some embodiments, the receiver 100 includes at least one light-emitting diode (LED) module 110. The LED module according to some embodiments is used to indicate a state of the receiver 100 including a connection state with the user terminal 200 and a signal reception state from the transmitter 20, and is used to perform a command based on the signal received from the transmitter 20. For example, the receiver 100 allows the LED module 110 to emit light of different colors in different patterns corresponding to the signal received from the transmitter 20.

In some embodiments, the LED module 110 includes one or more LEDs having different colors. For example, the LED module includes at least one of red, green, blue and colorless (white) colors. The LED module also produces a colorless color (white) by using red, green and blue. In addition, the LED module reduces the power consumption by expressing a colorless color (white) with a separate LED.

In some embodiments, the power required for the operation of the receiver 100 is obtained from the user terminal 200. In some other embodiments, the receiver 100 includes a separate battery. In some other embodiments, the receiver 100 is wirelessly charged using radio waves transmitted from the transmitter 20. To this end, the stadium or concert hall is provided with one or more intermediate transmitters for receiving, amplifying and transmitting the radio wave of the transmitter 20 in the middle. In addition, a transmitter capable of wireless charging is further included in each seat, and is designed to increase the transmission rate of radio waves and enable wireless charging.

Figure 3:
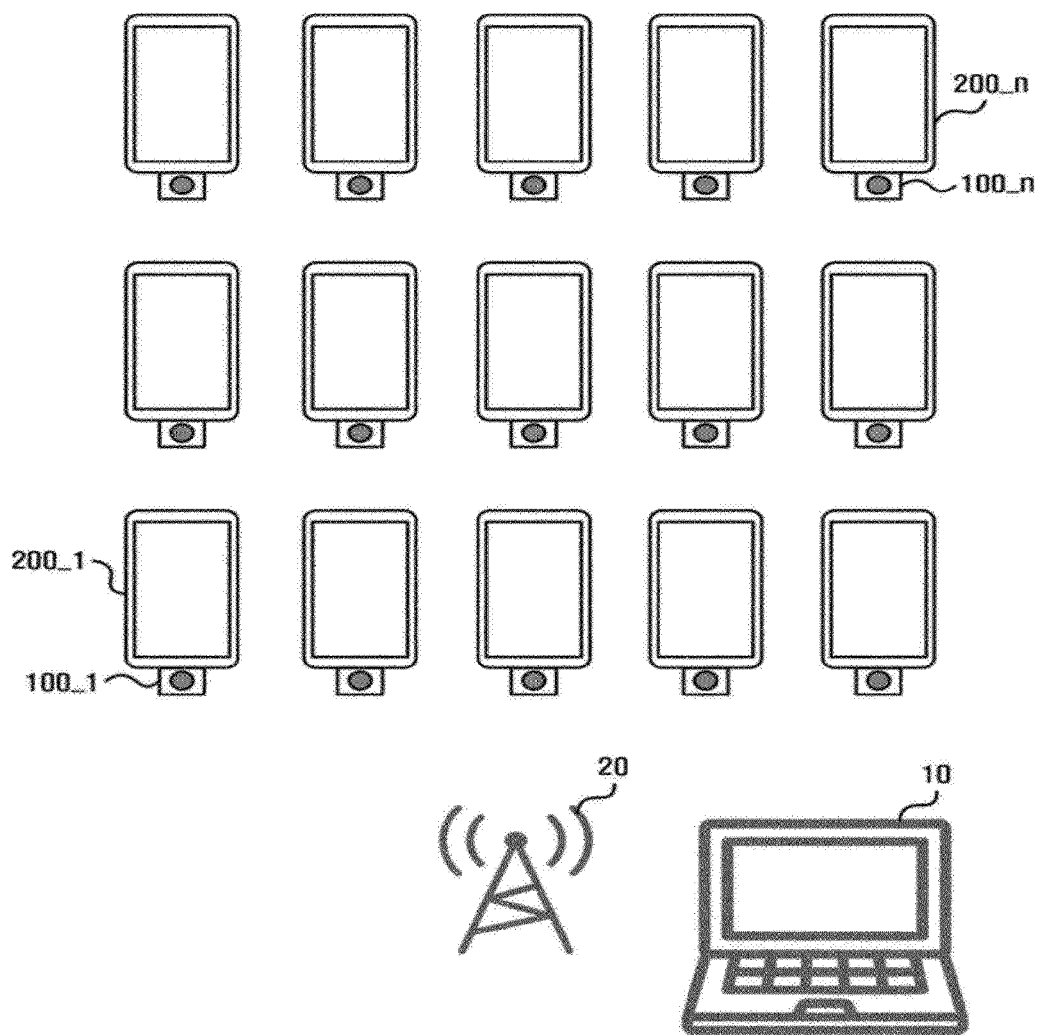
FIG. 3 is a diagram illustrating a method of controlling a plurality of user terminals and a plurality of receivers according to some embodiments of the present disclosure.

FIG. 3 is a diagram illustrating a method of controlling a plurality of user terminals and a plurality of receivers according to some embodiments.

In a concert hall or stadium, there would be user terminals 200_1 to 200_n of audiences located at different seats and receivers 100_1 to 100_n connected to the user terminals 200_1 to 200_n, respectively.

The manager determines the contents to be expressed by using the LED module of each of the receivers 100_1 to 100_n and each of the user terminals 200_1 to 200_n by using the control device 10.

In some embodiments, the manager implements a uniform production by allowing the LED module of each of receivers 100_1 to 100_n and each of the user terminals 200_1 to 200_n to reproduce the same color lighting or the same image.

For example, by controlling the LEDs of each of the receivers 100_1 to 100_n to emit light of the same color, it is possible to obtain a uniform cheering effect in a concert hall or stadium. In addition, the lighting effect is obtained by using the LEDs of the receivers 100_1 to 100_n when necessary in a dark concert hall or a stadium where night games are performed.

As another example, by controlling the receivers 100_1 to 100_n to emit light of different colors corresponding to seats, it is possible to obtain a colorful cheering effect using a variety of colors.

As a specific example, the manager generates a specific directing effect by using the control device 10, and controls the receivers 100_1 to 100_n to emit light of different colors or to selectively flicker, thereby controlling all audience seats to represent a single letter, image, message, and the like. That is, the manager implements a media facade by using the LED modules of the receivers 100_1 to 100_n.

In some embodiments, the manager implements a media facade by using a screen of each of the user terminals 200_1 to 200_n. The manager uses the control device 10 and the transmitter 20 to allow the screens of the user terminals 200_1 to 200_n to be bright with the same color or different monochrome colors, flickered in a specific pattern, or turned on or off.

For example, by allowing the screen of each of the user terminals 200_1 to 200_n to emit the same color as the LED module of each of the receivers 100 connected thereto, the light of brighter colors is displayed in a wider area. As another example, a screen of each of the user terminals 200_1 to 200_n emits a different color from that of the LED module of each of the receivers 100 connected thereto.

In implementing the media facade, the control device 10 assumes each pair of the user terminals 200_1 to 200_n different from each other and the LED modules of the receivers 100_1 to 100_n respectively connected to the user terminals 200_1 to 200_n as one pixel, and allows the pixels to display colors, respectively, thereby implementing one large screen for displaying an image.

In addition, the control device 10 according to some embodiments assumes each of the different user terminals 200_1 to 200_n and the different receivers 100_1 to 100_n as one pixel, and allows the pixels to display colors, respectively, thereby implementing one large screen for displaying an image.

In addition, the control device 10 according to some embodiments assumes each of the different user terminals 200_1 to 200_n as partial screens of a large screen, and allows each partial screen to display a part of one large image, so that it is possible to display one large screen.

In addition, the control device 10 according to some embodiments allows the different user terminals 200_1 to 200_n to simultaneously reproduce a particular piece of music or sound, respectively, and allows each of the different user terminals 200_1 to 200_n to vibrate at the same time or in a specified order, thereby obtaining various directing effects.

For example, the control device 10 performs a surf directing that is commonly used in a concert hall or stadium. When the different user terminals 200_1 to 200_n and the receivers 100_1 to 100_n sequentially perform command from one side of the audience seats to another side by using light, an image, sound, and vibration, the same effect as surf cheering are achieved in all the audience seats.

In addition, the control device 10 according to some embodiments allows each of the different user terminals 200_1 to 200_n to simultaneously reproduce a specific advertisement, thereby obtaining an effect of marketing to the audiences.

For example, in the case of baseball games, advertising is played every break time during television broadcasting. However, there is no advertising medium other than a large scoreboard in the stadium. According to some embodiments of the present disclosure, an advertisement reproduction command is transmitted to the receivers 100_1 to 100_n by using the transmitter 20, and the command received by each of the receivers 100_1 to 100_n is transmitted to the user terminals 200_1 to 200_n, such that it is possible to allow each of the different user terminals 200_1 to 200_n to reproduce an advertisement at the same time.

In some embodiments, each of the different user terminals 200_1 to 200_n reproduces an advertisement. In some other embodiments, each of the different user terminals 200_1 to 200_n reproduces a part of one large screen, such that one large advertisement is reproduced in all the audience seats.

In reproducing an advertisement, the control device 10 according to some embodiments transmits a command to download the advertisement in advance to each of the different user terminals 200_1 to 200_n by using the transmitter 20. Each of the different user terminals 200_1 to 200_n starts to download an advertisement in advance corresponding to the received command. In such embodiments, the control device 10 transmits a command to reproduce an advertisement after a predetermined amount of time by using the transmitter 20, and each of the different user terminals 200_1 to 200_n reproduces the stored advertisement immediately corresponding to the received command.

Accordingly, each of the different user terminals 200_1 to 200_n operates as a cheering tool, transmits necessary information to each audience, and operates as an advertisement medium corresponding to the command transmitted from the control device 10.

In order to perform the above-described direction, the control device 10 is requested to transmit different commands to each of the receivers 100_1 to 100_n located in each seat by using the transmitter 20.

In some embodiments, the control device 10 designates each of the different receivers 100_1 to 100_n by utilizing different frequencies or transmitting commands at different time points, or transmits a command in which each group of different receivers 100_1 to 100_n is designated.

In some other embodiments, the control device 10 simultaneously transmits a command including a plurality of instructions at the same frequency, and each of the different receivers 100_1 to 100_n receiving the command receives the same signal, so each of the different receivers 100_1 to 100_n or different user terminals 200_1 to 200_n selectively performs a command corresponding to a corresponding seat location.

In some other embodiments, the signal transmitted by the control device 10 using the transmitter 20 is only a trigger signal for notifying the start and end of a specific command. In addition, there is previously stored control information, and the control device 10 uses the transmitter 20 to transmit only the signal for selecting one of the previously stored control information to start or stop.

In some embodiments, each of the different user terminals 200_1 to 200_n downloads and performs a command corresponding to the received signal from the server 30.

In some embodiments, the control device 10 transmits a ready signal to the different receivers 100_1 to 100_n before transmitting the start signal of a specific command.

The different receivers 100_1 to 100_n transmit signals to the user terminals 200_1 to 200_n, and the user terminals 200_1 to 200_n download necessary information from the server 30 in advance when the ready signal is received.

Thereafter, the control device 10 transmits a start signal of a specific command, and the user terminals 200_1 to 200_n, which receive the start signal, immediately performs the command by using information previously downloaded and stored.

When the start time point of a specific command is received through the server 30, there are many cases where it is difficult to transmit the start time point to the different user terminals 200_1 to 200_n at the same time due to the communication state, the connection state of each terminal, the delay of the server 30, and the like.

According to some embodiments of the present disclosure, because a signal is transmitted using the transmitter 20 and each of the receivers 100_1 to 100_n receives the signal by using an antenna, a command is delivered at the same time.

In addition, according to some embodiments of the present disclosure, the receivers 100_1 to 100_n are connected to the user terminals 200_1 to 200_n by operations of users and a signal received by wire is transmitted, unlike other wireless communication means such as Bluetooth™ or ZIGBEE™, signals and instructions are transmitted to any type of user terminals simultaneously without any authorization issues.

Figure 4:
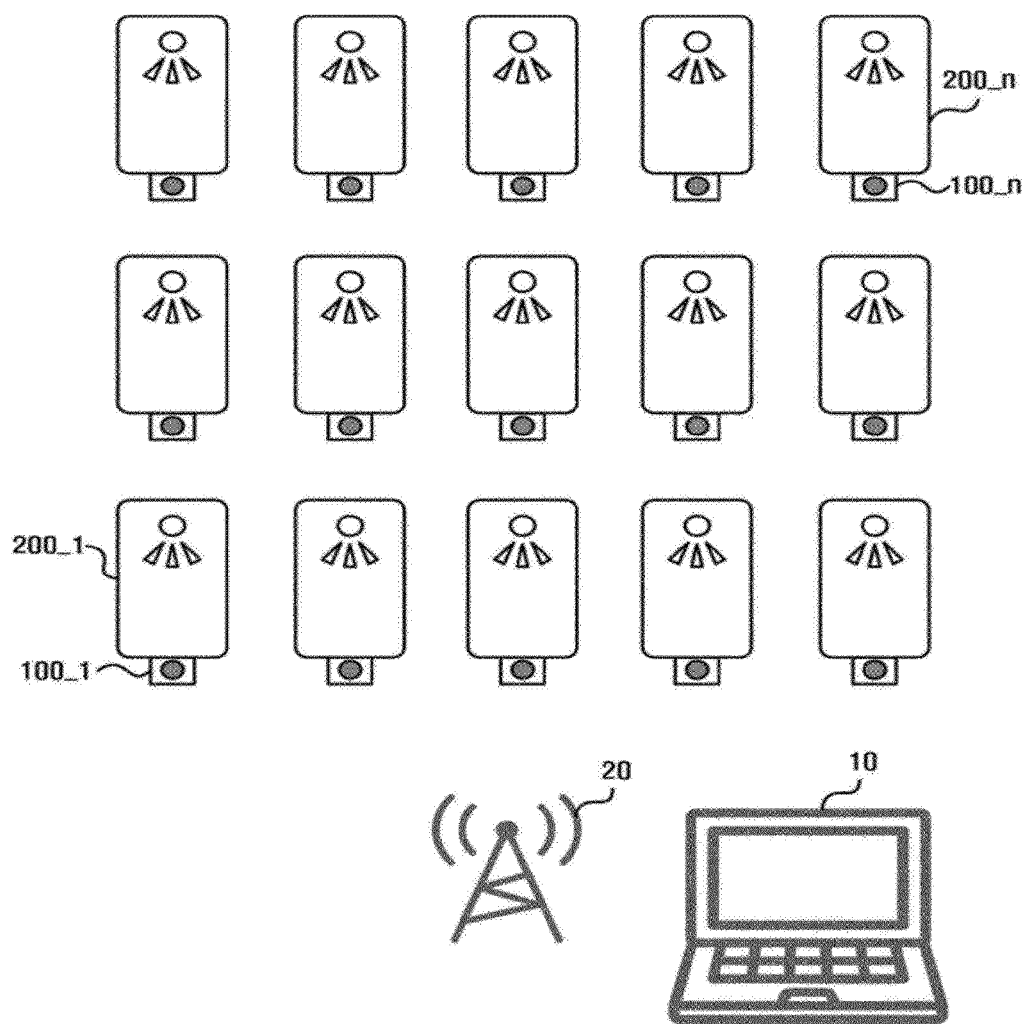
FIG. 4 is a diagram illustrating a method of controlling a plurality of user terminals and a plurality of receivers according to some other embodiments of the present disclosure.

FIG. 4 is a diagram illustrating a method of controlling a plurality of user terminals and a plurality of receivers according to some other embodiments.

FIG. 3 illustrates a directing method using the screen of each of the user terminals 200_1 to 200_n.

FIG. 4 illustrates a directing method in a state in which the rear surface of each of the user terminals 200_1 to 200_n faces forward.

In this case, the control device 10 performs directing, which uses flashlight of each of the user terminals 200_1 to 200_n, by using the transmitter 20. The control device 10 performs various directing described with reference to FIG. 3 by using the flashlights of the user terminals 200_1 to 200_n and the LED modules of the receivers 100_1 to 100_n.

In some embodiments, the control device 10 controls a camera of each of the user terminals 200_1 to 200_n. For example, the control device 10 controls a rear camera of each of the user terminals 200_1 to 200_n to photograph the foreground of a stadium or concert hall, and collects the photographed images through the server 30 to construct a database. The server 30 generates various images by using the constructed database, and displays them on a display of a concert hall or a stadium or provide them to the user terminals 200_1 to 200_n.

In addition, the control device 10 according to some embodiments controls a front camera of each of the user terminals 200_1 to 200_n to photograph audiences, and collects the photographed images through the server 30 to construct a database. In such embodiments, the server 30 generates various images by using the constructed database, and displays them on a display of a concert hall or stadium or provide them to the user terminals 200_1 to 200_n.

Figure 5:
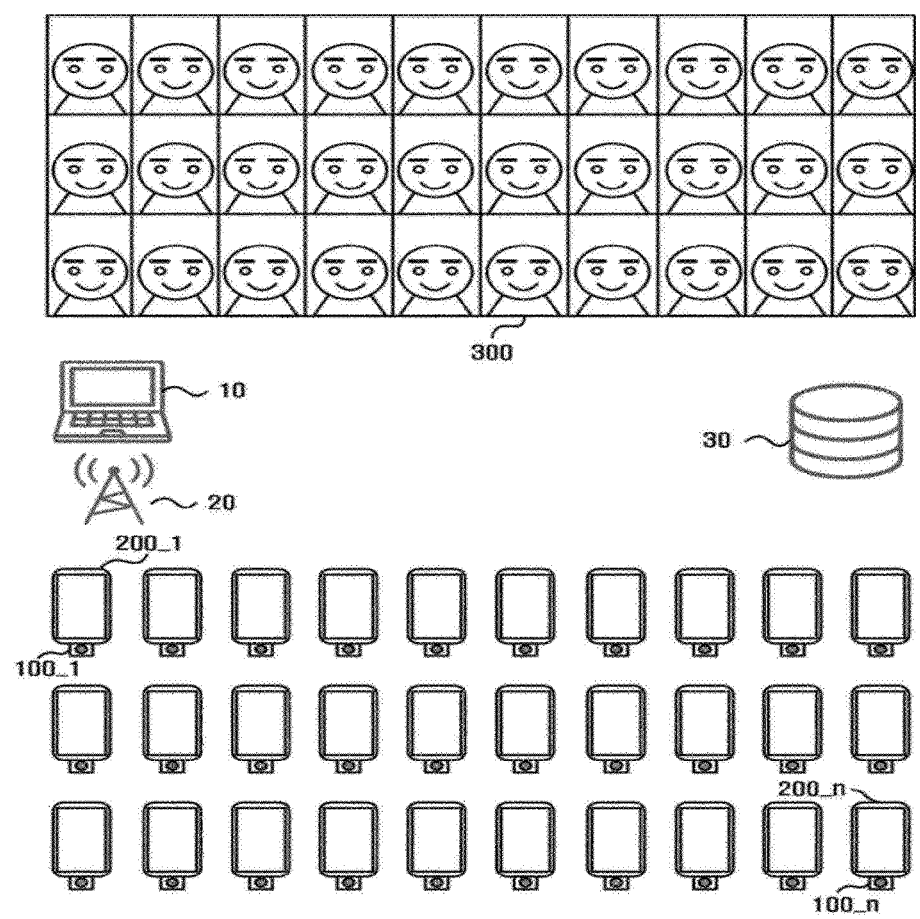
FIG. 5 is a diagram illustrating a concert hall directing method according to some embodiments of the present disclosure.

FIG. 5 is a diagram illustrating a concert hall directing method according to some embodiments.

As described in FIG. 4, the control device 10 controls the front camera of each of the user terminals 200_1 to 200_n to photograph audiences, and collects the photographed images through the server 30 to construct a database.

The server 30 displays the audiences photographed on the display of a concert hall to correspond to their seat locations, thereby allowing the audiences to gain experience as a part of the concert. According to some embodiments, the faces to be displayed on the display are variously combined and arranged.

In some embodiments, the control device 10 controls the front camera of each of the user terminals 200_1 to 200_n located in a partial area of the entire audience seats to photograph audiences, and obtains the photographed images through the server 30. The photographing includes both taking a photo and taking a video.

The control device 10 according to some embodiments sequentially selects different zones of the audience seats, controls the front camera of each of the user terminals 200_1 to 200_n located in the selected zone to photograph audiences, and obtains the photographed image through the server 30. The server 30 sequentially displays the sequentially photographed audiences on the display of the concert hall, such that different audiences are sequentially displayed on the display of the concert hall.

When photographing an audience, the LED module provided in each of the receivers 100_1 to 100_n operates as flashlight, which is not normally provided in the front camera.

In some embodiments, each of the user terminals 200_1 to 200_n obtains an image including the face of a user by using the front camera. Each of the user terminals 200_1 to 200_n determines whether to drive the flashlight based on at least one of brightness and color of the obtained image.

In some embodiments, each of the user terminals 200_1 to 200_n determines whether to drive the flashlight and the brightness and color of the flashlight based on at least one of the brightness and the color of the obtained image. For example, each of the user terminals 200_1 to 200_n increases the brightness of the flashlight when the obtained image is dark. As another example, when it is determined that a specific color is widely included in the obtained image as a case where the obtained image is red or blue, each of the user terminals 200_1 to 200_n controls the LED module to allow flashlight of a color capable of correcting the specific color to illuminate.

In some embodiments, each of the user terminals 200_1 to 200_n obtains a face color of a user included in the obtained image, and controls the LED module to illuminate flashlight of a color capable of correcting the face color of the user. For example, when it is determined that the face color of the user included in the obtained image is red, each of the user terminals 200_1 to 200_n controls the LED module to illuminate flashlight having a color that can alleviate the red color.

Each of the receivers 100_1 to 100_n according to some embodiments drives an LED module by receiving a command from each of the user terminals 200-1 to 200-n, and drives an LED module by receiving commands from the control device 10 and the transmitter 20.

The LED module provided in each of the receivers (100_1 to 100_n) automatically adjusts the brightness corresponding to a situation, or commands from the user terminals 200_1 to 200_n or the control device 10. In addition, the LED module provided in each of the receivers 100_1 to 100_n assists in taking a selfie of a specific atmosphere by turning on LED lights of different colors corresponding to external control.

Figure 6:
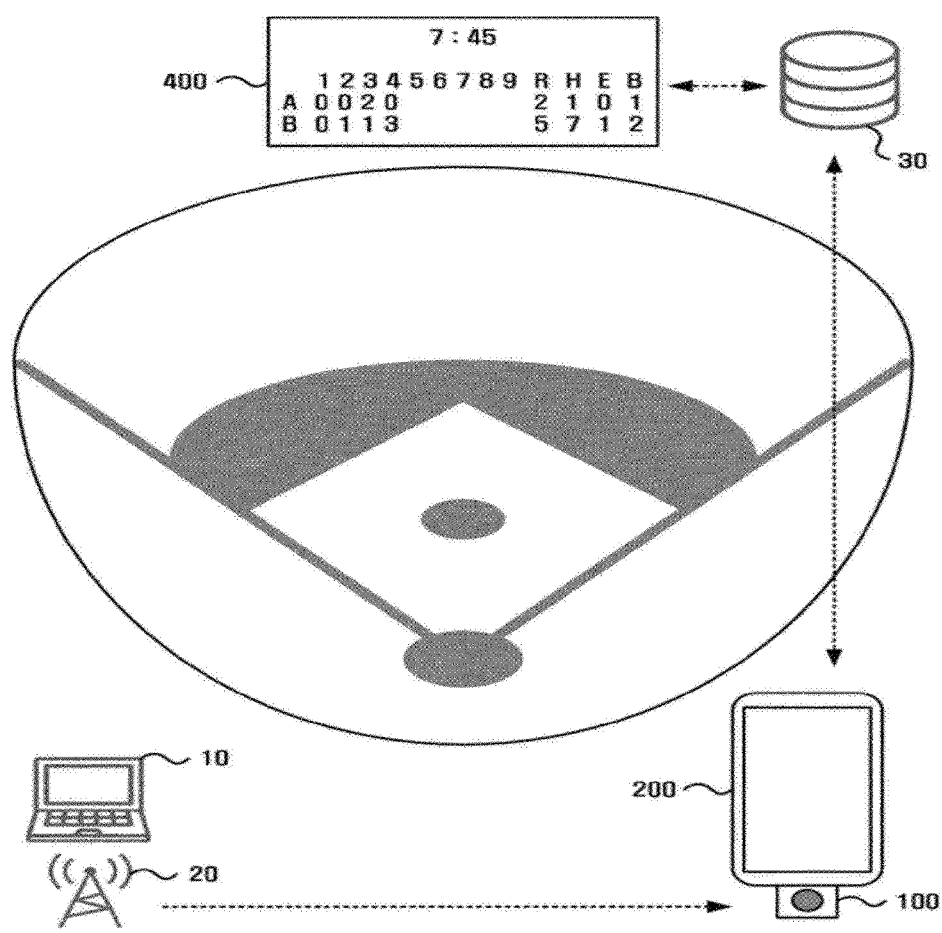
FIG. 6 is a diagram illustrating a method of performing a control in a sports stadium according to some embodiments of the present disclosure.

FIG. 6 is a diagram illustrating a method of performing a control in a sports stadium according to some embodiments.

Although FIG. 6 illustrates a method of performing a control in a baseball stadium, it is obvious that the control method according to some embodiments of the present disclosure can be used in all kinds of sports stadiums and concert halls.

In a stadium, the audiences collect various information about a game by using the user terminal 200. In general, audiences use a mobile web page or text broadcasting of an application, video broadcasting, and the like to obtain information that cannot be obtained in the stadium or to watch replays of important scenes.

However, the video and text broadcasting that are transmitted through the Internet is bound to be very slow compared to the game field. According to some embodiments of the present disclosure, the control device 10 transmits real-time text broadcasting or a game video to the receiver 100 by using the transmitter 20, and the receiver 100 transfers the received text broadcasting or game video to the user terminal 200 to provide text broadcasting or game video to the audience.

In some embodiments, real-time information transmitted to an electronic display board 400 is also transmitted to the user terminal 200 through the server 30, such that the controller 10 obtains the real-time information through the link or command transmitted to the user device 200.

Therefore, the audience according some embodiments quickly obtains the necessary information by using the receiver 100 and the user terminal 200, and the manager obtains a marketing effect by transmitting an advertisement image, voice or image at a specified cycle.

In addition, when there is a group cheering every specific time points in a sports stadium, and the manager is able to produce a unified cheering effect through simultaneous signal transmission using the transmitter 20.

Figure 7:
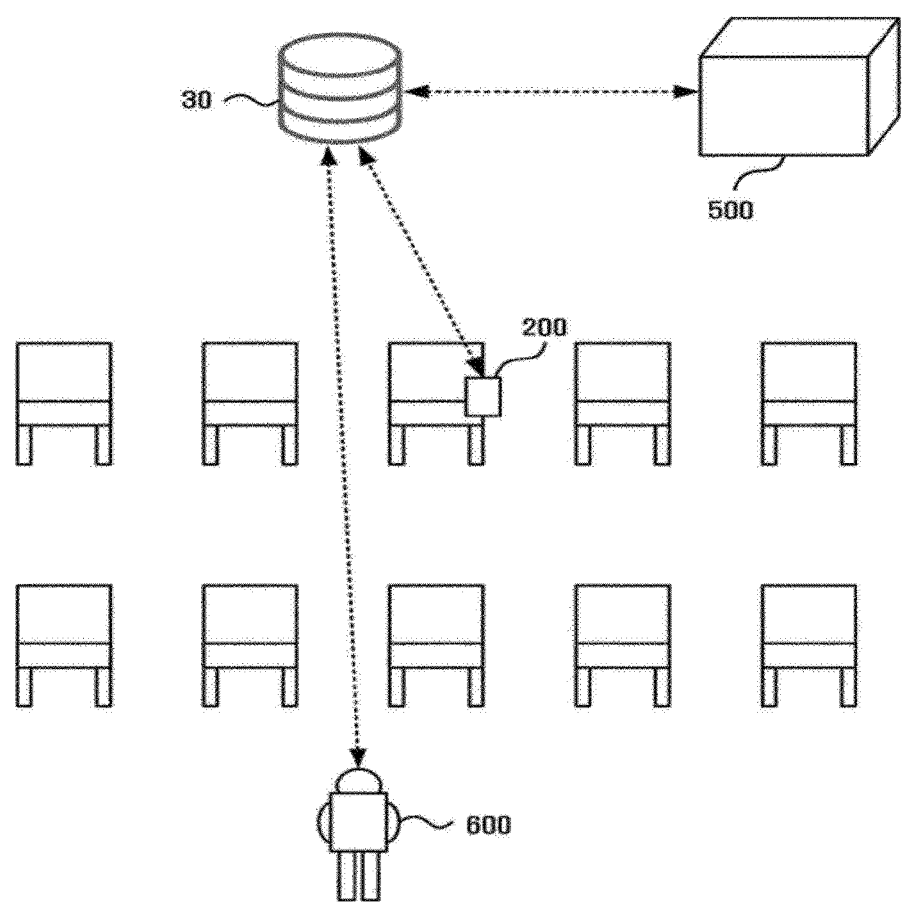
FIG. 7 is a diagram illustrating a method of providing a convenience service according to some embodiments of the present disclosure.

FIG. 7 is a diagram illustrating a method of providing a convenience service according to some embodiments.

In the embodiments described with reference to FIGS. 1 to 6, the seat information of each audience is stored in the user terminal 200. Therefore, in the concert hall or stadium, the server 30 provides a service based on the seat information of each user terminal 200.

For example, the user terminal 200 transmits information for ordering food or beverages, and the server 30 informs of the seat location at which each order is received to a shop 500 or a salesperson 600, thereby providing a service of delivering food or beverages to each audience.

In addition, even when an emergency occurs and when the user terminal 200 is used to report, the server 30 transmits a rescue request together with the seat information to a rescuer, so that it is possible to solve the problem quickly.

Figure 8:
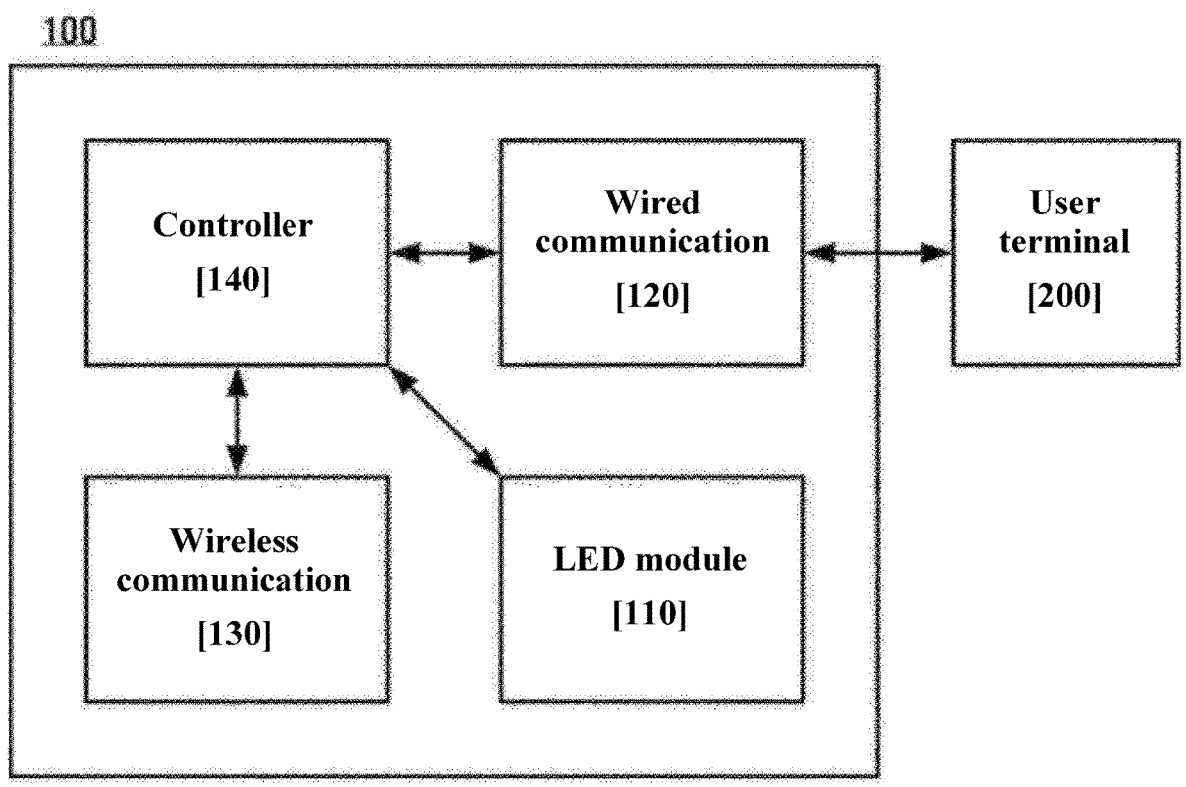
FIG. 8 is a block diagram illustrating a receiver according to some embodiments of the present disclosure.

FIG. 8 is a block diagram illustrating a receiver according to some embodiments.

In some embodiments, the receiver 100 includes the LED module 110, a wired communication device 120, a wireless communication device 130 and a controller 140.

In some embodiments, the LED module 110 includes at least one LED and provides light of different colors and brightness.

In some embodiments, the wired communication device 120 is used to connect with the user terminal 200, and includes a micro 5-pin, lightning 8-pin or a USB-C type of connection, but is not limited thereto.

In some embodiments, the wireless communication device 130 includes at least one physical antenna or antenna module for receiving a signal transmitted from the transmitter 20.

In some embodiments, the controller 140 controls the wireless communication device 130 to allow the received signal to be transmitted to the user terminal 200 by using the wired communication device 120. In addition, the controller 140 controls the LED module 110 corresponding to a command received from the control device 10 or the user terminal 200. The controller 140 according to some embodiments include a hardware processor.

The operations of the method or algorithm described in connection with some embodiments of the inventive concept may be implemented directly in hardware, in a software module executed by hardware, or by a combination thereof. The software module may reside in random access memory (RAM), read-only memory (ROM), erasable programmable ROM (EPROM), electrically erasable programmable ROM (EEPROM), flash memory, hard disk, a removable disk, CD-ROM, or any form of computer-readable recording medium well known in the art.

According to the disclosed embodiments, various cheering effects may be produced by using a plurality of user terminals and LED modules.

In addition, the media facade may be implemented by using screens of a plurality of user terminals, and a marketing effect may be obtained by displaying an advertisement on the screen of a user terminal in a concert hall or stadium.

In addition, various information and convenience services may be provided for audiences by using a plurality of user terminals and a receiver.

Effects of the inventive concept may not be limited to the above, and other effects of the inventive concept will be clearly understandable to those having ordinary skill in the art from the disclosures provided below together with accompanying drawings.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting but illustrative.

What is claimed is:

1. A control system for controlling a plurality of user terminals, the control system comprising:
a control device including a processor, and configured to determine a command to be executed by the plurality of user terminals located in a concert hall or stadium;
a transmitter configured to transmit a wireless signal corresponding to the determined command;
a plurality of receivers, each of which is connected to a respective user terminal of the plurality of user terminals, receives the wireless signal, and transmits the received wireless signal to the respective user terminal;
the plurality of user terminals, each of which is configured to perform a command corresponding to the wireless signal transmitted from a respective receiver of the plurality of receivers; and
a server configured to store data configured to be used by the plurality of user terminals to perform the command,
wherein the wireless signal includes link information for downloading the data from the server,
wherein each of the plurality of user terminals is configured to download the data from the server, by using the link information included in the wireless signal transmitted from the transmitter,
wherein the wireless signal includes a ready signal and a start signal,
wherein the ready signal includes the link information,
wherein the transmitter is configured to transmit the ready signal at a first time, and, after a predetermined time period, transmit the start signal at a second time, which is a time when the command is configured to be performed, and
wherein each of the plurality of user terminals is configured to start downloading of the data from the server in response to a receipt of the ready signal transmitted from the respective receiver, and perform the command by using the downloaded data in response to a receipt of the start signal transmitted from the respective receiver.

2. The control system of claim 1, wherein each of the plurality of user terminals is configured to obtain seat information of each of the plurality of user terminals,
wherein the control device is configured to determine different commands for the plurality of user terminals located in different seats,
wherein the transmitter is configured to transmit a wireless signal including the different commands, and
wherein each of the plurality of user terminals is configured to perform a command corresponding to a seat in which each of the plurality of user terminals is located, among the different commands included in the wireless signal.

3. The control system of claim 2, wherein the control device is configured to determine an order in which to perform the different commands corresponding to the seats, and
wherein the plurality of user terminals are configured to sequentially perform the different commands in the determined order.

4. The control system of claim 2, wherein each of the plurality of user terminals is configured to obtain an image of a ticket of the concert hall or stadium by photographing the ticket, transmit the obtained image to the server, and obtain the seat information from the server.

5. The control system of claim 2, further comprising:
a seat information inputter configured to input the seat information to each of the plurality of receivers,
wherein the seat information inputter is configured to obtain seat information from tickets of the concert hall or stadium, and input the obtained seat information to each of the plurality of receivers, and
wherein each of the plurality of user terminals is configured to obtain the seat information from the respective receiver.

6. The control system of claim 1, further comprising:
a display located in the concert hall or stadium,
wherein the server is further configured to control the display,
wherein each of the plurality of user terminals is, based on the command, configured to take a picture or video by using a camera, and transmit the taken picture or video to the server, and
wherein the server is configured to display the received picture or video on the display.

7. The control system of claim 6, wherein each of the plurality of receivers further includes a light-emitting diode (LED) module, and
wherein the command includes a command to allow the LED module to irradiate light having different brightness and colors when each of the plurality of user terminals takes a picture or video.

8. The control system of claim 7, wherein each of the plurality of user terminals is configured to obtain an image including a face of a user by using the camera, and control a brightness and color of the LED module corresponding to a color of the face of the user, detected from the obtained image.

9. The control system of claim 1, wherein the command includes at least one of a command to display a specific picture or video on a screen of each of the plurality of user terminals, a command to display a specific color on the screen of each of the plurality of user terminals, a command to cause each of the plurality of user terminals to reproduce a particular piece of music, a command to cause each of the plurality of user terminals to turn on flashlight, a command to cause each of the plurality of user terminals to take a picture or video, and a command to cause each of the plurality of user terminals to vibrate.

* * * * *